Oct. 18, 1949.  E. F. DUFFY  2,485,371
TRACTOR-TRAILER HITCH

Filed Feb. 9, 1949  2 Sheets-Sheet 1

INVENTOR.
Edward F. Duffy,
BY Morsell & Morsell
ATTORNEYS.

Oct. 18, 1949.  E. F. DUFFY  2,485,371
TRACTOR-TRAILER HITCH
Filed Feb. 9, 1949  2 Sheets—Sheet 2
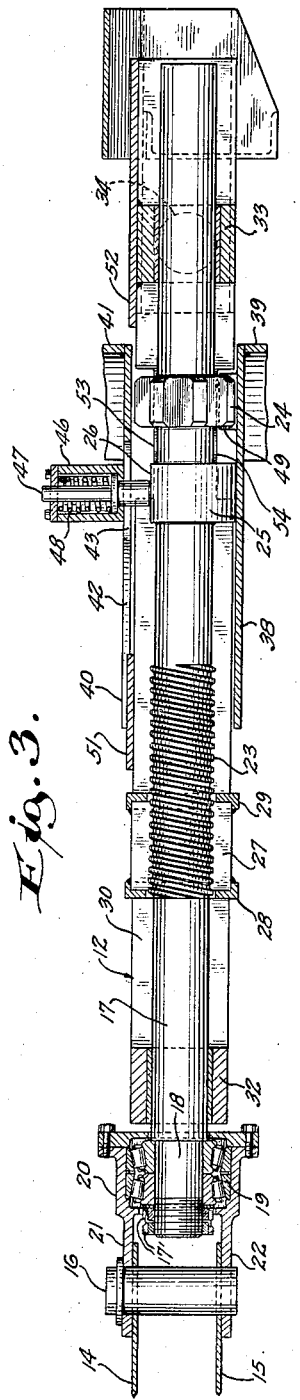
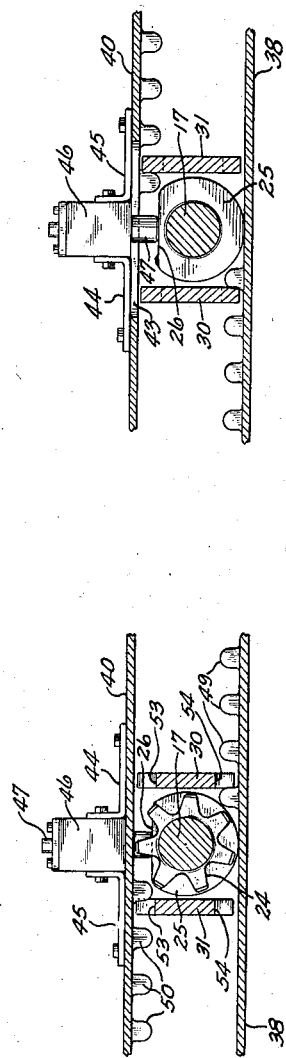
INVENTOR.
Edward F. Duffy,
BY Morsell & Morsell
ATTORNEYS.

Patented Oct. 18, 1949

2,485,371

UNITED STATES PATENT OFFICE 2,485,371

TRACTOR-TRAILER HITCH

Edward F. Duffy, La Crosse, Wis., assignor to La Crosse Trailer Corporation, La Crosse, Wis., a corporation of Wisconsin Application February 9, 1949, Serial No. 75,411

20 Claims. (Cl. 280—33.05)

This invention relates to improvements in tractor-trailer hitches.

The majority of hitches in use today for the purpose of pivotally coupling trailers to tractors are of the "fifth wheel" type. When using this type of coupling, either the trailer must be spaced a considerable distance from the tractor, or portions of the front end of the trailer must be rounded off to provide adequate turning clearance between the tractor and the trailer in order that the trailer body will not contact or interfere with any part of the tractor body during relative turning movements.

A particularly serious turning problem is presented in certain articulated vehicles, such as tractor-trailer auto transport assemblages. Laws prescribe the limits as to length, width and height for such vehicles, and, in order to utilize the maximum amount of space within the prescribed limits for auto carrying purposes, it is essential that the rear end of the tractor body and the forward end of the trailer body of such vehicles be substantially square and in close proximity.

It has heretofore been proposed to provide a tractor-trailer hitch which maintains the trailer coupled closely to the tractor when the trailer is in an alined position behind the tractor, and which longitudinally displaces the trailer away from the tractor upon a substantial turning movement of the assemblage. The hitches heretofore proposed, however, have not been entirely satisfactory and have had objections and limitations.

It is, therefore, a general object of the present invention to provide a tractor-trailer hitch of the drawbar type which maintains the trailer and tractor in closely coupled relationship when alined, and which displaces the trailer away from the tractor during a turning operation.

A further object of the invention is to provide a tractor-trailer hitch of the class described having a drawbar which is automatically extensible in response to swinging movement thereof in a horizontal plane.

A further object of the invention is to provide a hitch of the class described wherein the drawbar is comprised of a first section having a rotatable shaft portion which is formed with exterior screw threads and a second non-rotatable section having as an integral part thereof a nut mounted on said threaded shaft; said shaft being formed with a gear which coacts with one of two racks which, upon swinging movement of said drawbar in a horizontal plane, causes rotation of said gear and of said shaft to thereby move the nut longitudinally along said threaded shaft.

A further object of the invention is to provide a tractor-trailer hitch which is simple in construction, which is inexpensive to manufacture, which is strong and durable, and which is otherwise well adapted for the purposes described.

With the above and other objects in view, the invention consists of the improved tractor-trailer hitch, and its parts and combinations as set forth in the claims, and all equivalents thereof.

Referring to the drawings accompanying and forming a part of this specification, wherein is disclosed one complete embodiment of the preferred form of the invention, and wherein the same reference characters indicate the same parts in all of the views:

Fig. 3 is an enlarged, fragmentary, longitudinal, vertical sectional view through the improved hitch taken along the line 3—3 of Fig. 1;

Fig. 4 is an enlarged, transverse, vertical sectional view taken along the line 4—4 of Fig. 1; and Fig. 5 is an enlarged, transverse, vertical sectional view taken along the line 5—5 of Fig. 1.

Figure 1:
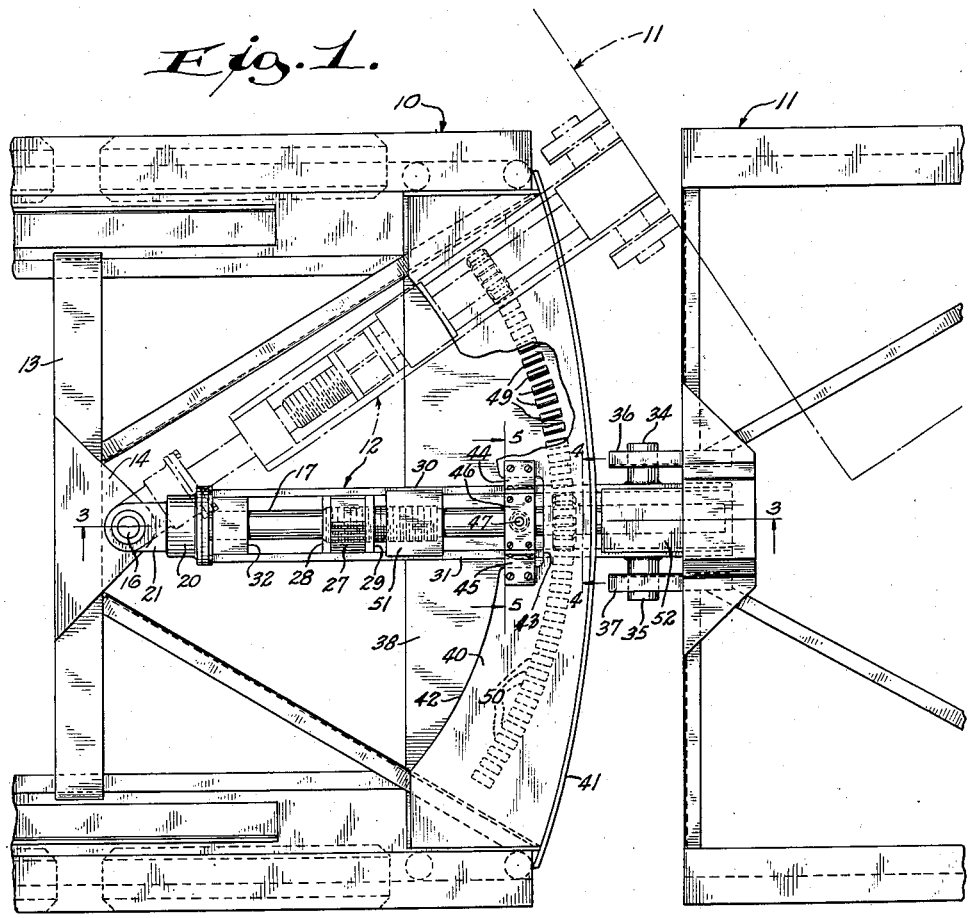
Fig. 1 is a fragmentary plan view of the adjacent end portions of a tractor-trailer chassis with the same being connected by the improved hitch, parts being broken away.
Figure 2:
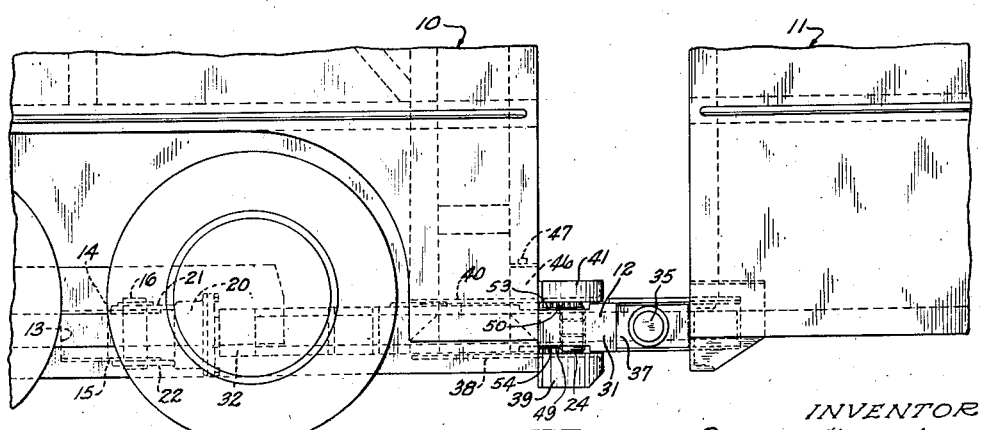
Fig. 2 is a fragmentary side view of the tractor and trailer bodies of Fig. 1 connected by the improved hitch.

Referring more particularly to Figs. 1 and 2 of the drawings, the numeral 10 indicates the rear end of the tractor of an articulated auto transport vehicle, and the numeral 11 indicates the forward end of the trailer of said articulated vehicular assemblage. The numeral 12 indicates the drawbar of the improved hitch for connecting the tractor 10 with the trailer 11.

A structural member 13 extends transversely across the lower portion of the tractor chassis 10 and is spaced forwardly of the rear end of said chassis and the body carried thereby. Fixed to the upper and the lower surfaces of the member 13 are rearwardly extending spaced parallel lugs or ears 14 and 15 which are apertured to receive a vertically extending pivot pin 16. The drawbar 12 is mounted for swinging movement in a horizontal plane about the pin 16.

The drawbar comprises a shaft 17 (see Figs. 1 and 3) which may be formed at one end with a portion of reduced diameter 18, on which is adapted to be mounted a suitable double thrust bearing 19. The bearing 19 may be held in position on the shaft 17 by nuts 17' threaded on the end of said shaft. Surrounding the bearing 19 is a suitable bearing housing 20 which is formed with a pair of spaced parallel longitudinally projecting lugs 21 and 22 which are also apertured to receive the pivot pin 16, as shown in Fig. 3. The lugs 21 and 22 preferably engage the upper and lower surfaces of the lugs 14 and 15, respectively. The shaft 17 is, therefore, rotatable and swingable relative to the tractor chassis 10 and its body.

Intermediate its length the shaft 17 is formed with screw threads 23 (see Fig. 3). Spaced rearwardly of the threaded portion 23 the shaft 17 is formed with an integral pinion 24. Spaced forwardly of the pinion 24 and rearwardly of the threaded portion 23, the shaft 17 is formed with a portion of enlarged diameter as at 25. The enlargement or cam 25 has a portion cut away to provide a flat surface 26 on the periphery thereof.

Threaded on the portion 23 of the shaft 17 is a nut 27 which may be split axially into two halves. The halves of the nut 17 may be held together by a pair of collars 28 and 29 which fit over the ends of the nut and may be welded thereto, as shown. Fixed, as by welding, to diametrically opposite sides of the nut 27 and the collars 28 and 29 are a pair of elongated bars 30 and 31 which extend parallel with the shaft 17. At their forward ends the bars 30 and 31 are fixed to a bearing block 32 which surrounds the shaft 17. The bearing block 32 is adapted to slide axially on the shaft 17, as well as being adapted to permit rotation of the shaft 17 therein. Fixed to the bars 30 and 31, preferably at a point spaced forwardly of their rear ends, is a bearing block 33. The bearing block 33 surrounds the shaft 17 and is axially slidable thereon while permitting rotation of the shaft 17 therein.

Adjacent the bearing block 33 the bars 30 and 31 are provided on their outer sidewall surfaces with alined horizontally, outwardly extending trunnions 34 and 35. Projecting forwardly from the lower portion of the forward end of the trailer body 11 are a pair of spaced parallel bearings 36 and 37 in which are journalled the trunnions 34 and 35 respectively. The axis of the shaft 17 is normally in a horizontal plane, and the axis of the trunnions 34 and 35 are also normally in a horizontal plane but at an angle of substantially 90° from the axis of the shaft 17, as shown.

Adjacent the rear of the nut 27 a plate 51 is positioned on the upper edges of the bars 30 and 31 and is rigidly fixed thereto. The bars 30 and 31 are also rigidly connected at their rear ends by a plate 52 which is also positioned on their upper edges. If desired, the bars 30 and 31 may be rigidly connected at other suitable points for reinforcement purposes.

Extending transversely across the rear end of the chassis 10 adjacent the lower edges of the bars 30 and 31 is a horziontal plate 38. The plate 38 may have an arcuate rear edge to which is fixed, as by welding, a stiffening bar 39. Extending transversely of the tractor body 10 above but parallel with the plate 38 and adjacent the upper edges of the bars 30 and 31, is an upper plate 40. The plate 40 may have an arcuate rear edge similar to that of the plate 38 to which is fixed, as by welding, a stiffening bar or plate 41. The plate 40 may have an arcuate forward edge 42 which has a central cut-out portion 43.

Mounted over the cut-out portion 43, as on brackets 44 and 45, fixed to the plate 40, is a housing 46. Slidably mounted for vertical movement in the housing 46 is a plunger 47. A spring 48 (see Fig. 3) urges the plunger 47 downwardly into engagement with the periphery of the enlargement 25 on the shaft 17 when said enlargement is positioned therebelow.

Mounted on the upper surface of the lower horizontal plate 38 to the right of the normal position of the shaft 17, as viewed in Fig. 4, is an arcuate rack 49. The rack 49 has a radius of curvature substantially equal to the distance between the pinion 24 and the pin 16. Mounted on the underside of the upper horizontal plate 40 and to the left of the normal position of the shaft 17, as viewed in Fig. 4, is an arcuate rack 50. The rack 50 has a radius of curvature substantially equal to that of the rack 49. The teeth of the racks 49 and 50 are of such size and are so spaced that they are adapted to mesh with the teeth of the pinion 24 when said pinion is moved into engagement with one of said racks.

In operation, the improved tractor-trailer hitch normally assumes the position shown in solid lines in all of the views. In this position, the shaft 17 is coaxial with the longitudinal axes of the tractor and the trailer. This condition obtains when the tractor and the trailer are travelling along a straightway, and it is because of this straight line movement that the trailer is alined with the tractor. When, however, the tractor vehicle is turned to one side or the other in negotiating a curve, the trailer, in following the tractor, becomes horizontally angularly displaced relative to the tractor. As this displacement occurs the drawbar 12 remains alined with the axis of the trailer and swings in a horizontal plane about the pivot pin 16. For the purpose of clarity of description it will be assumed that the tractor turns toward the right and thereby causes angular displacement of the trailer toward the dot and dash position of Fig. 1 with corresponding swinging movement of the drawbar 12 toward the dot and dash line position shown in Fig. 1.

As the drawbar 12 swings in the direction indicated, the pinion 24 engages the teeth of the arcuate rack 49. This causes clockwise rotation of the shaft 17 as viewed in Fig. 4. The pitch of the threads 23 on the shaft 17 is such that clockwise rotation of said shaft causes the nut 27 to move rearwardly along the threads 23. Since the bars 30 and 31 are fixed to the nut 27, they move rearwardly simultaneously with said nut. The bearing blocks 32 and 33 and the trunnions 34 and 35, being fixed to the bars 30 and 31, move rearwardly simultaneously with said bars.

It is apparent that as the trunnions 34 and 35 are moved rearwardly, the trailer 11 is moved rearwardly and is displaced longitudinally from the tractor 10. In effect, the drawbar 12 is extended simultaneously as it is swung, to thereby displace the trailer longitudinally from the tractor whenever there is horizontal angular displacement of the tractor relative to the trailer. As will be noted from Fig. 1, when the trailer is angularly displaced to the dot and dash line position therein, the trailer body is clear of the tractor body and there is no interference, one with the other.

As the tractor and the trailer negotiate the turn and begin to return toward the straight line relationship shown in solid lines in Fig. 1, the drawbar 12 swings back toward its normal position. As it does so, the pinion 24 is rotated by the rack 49 in a counterclockwise direction, as viewed in Fig. 4. This causes counterclockwise rotation of the shaft 17 which causes the nut 27 to move forwardly along the threads 23 toward the position shown in Figs. 1 and 3.

In order that extensible movement of the drawbar 12 be achieved by the swinging of said drawbar in either horizontal direction from its normal position shown in Fig. 1, the rack 50 is placed on the underside of the plate 40 and on the opposite side of the neutral position of the shaft 17 from the rack 49. From Fig. 4 it is apparent that movement of the shaft 17 to the left, as viewed in said figure, causes the pinion 24 to mesh with the rack 50 and causes clockwise rotation of said pinion and said shaft. Clockwise rotation of the shaft 17, therefore, is obtained by engagement of the pinion 24 with either of the racks 49 or 50. In order for the bars 30 and 31 to be able to swing as described, said bars are notched out as at 53 and 54 to permit them to clear the racks 49 and 50.

When the shaft 17 is swung in either direction and is thereby simultaneously rotated, the plunger 47 is raised against the pressure of the spring 48 by the flat surface 26 of the cam 25. The plunger 47 follows the periphery of the cam 25 until said cam moves out of contact therewith, at which time said plunger returns to its lowered position. As the shaft 17 swings back towards its normal position, the periphery of the cam 25 again engages the plunger 47 and forces said plunger upwardly against the pressure of the spring 48. However, as the plunger 47 engages the flat surface 26, it moves downwardly therealong until the shaft 17 is in its neutral position. The lower end of the plunger 47 is substantially flat, and the combination of the plunger loading provided by the spring 48 with the cooperating flat surfaces on the plunger and on the cam 25, tends to hold the shaft 17 against rotation until the pinion 24 actually contacts one of the racks 49 or 50.

It will be noted from Fig. 4 that the pinion 24, when in neutral position, is out of engagement with both the rack 49 and the rack 50. When in this position the shaft 17 is floating in its bearings, and were it not for the cam 25 and the plunger 47, the shaft 17 might rotate due to vibration and to the stresses to which said shaft is subjected. This, of course, would be objectionable, not only because of its extending effect on the drawbar 12, but also because the pinion 24 might assume a position of rotation wherein it wouldn't mesh with the racks upon swinging movement of the drawbar. Such a condition would be very dangerous. In Fig. 4 it will be noted that the pinion 24 is so disposed, when in neutral position, that it will mesh with either the rack 49 or 50 upon movement into engagement therewith. By holding the shaft 17 and the pinion 24 in the position shown in Fig. 4 when the drawbar is in its neutral position, positive meshing of the pinion 24 with the selected rack is assured and clashing of said pinion with said racks is prevented. At the same time inadvertent extension of the drawbar 12 is also prevented.

While the plunger 47 and its housing 46 are shown mounted on the plate 40, these members may, if desired, be mounted on the bars 30 and 31 or on the plate 38 with substantially equal effect. Similarly, the cam 25 may be located at other suitable positions on the shaft 17, if desired.

It is apparent that the improved hitch provides an efficient means for connecting a trailer having a body with a square front end to a tractor having a body with a substantially square rear end. When the vehicles are in alined position they are closely coupled, and upon horizontal angular displacement of said vehicles relative to one another, the trailer is automatically displaced rearwardly from the tractor. The improved hitch provides a means of utilizing the maximum amount of space within the length and width limitations provided by law regulating such vehicular assemblages. The hitch is positive in operation, and is particularly well adapted for use in articulated auto transport vehicles.

Various changes and modifications may be made without departing from the spirit of the invention, and all of such changes are contemplated, as may come within the scope of the claims.

What I claim is:

1. In a hitch for coupling a trailer and a tractor, an extensible drawbar adapted to be swingably connected at one end to a tractor and adapted to be connected at the other end to a trailer, said drawbar having a rotatable portion formed with a cam surface and having a non-rotatable portion formed with a cam surface, said cam surfaces being cooperable to cause relative longitudinal movement of said drawbar portions in response to rotation of said rotatable portion of the drawbar; and means associated with said drawbar for causing rotation of said rotatable drawbar portion upon swinging movement of the drawbar.

2. In a hitch for coupling a trailer and a tractor, an extensible drawbar adapted to be swingably connected at one end to a tractor and adapted to be connected at the other end to a trailer, said drawbar having a rotatable portion formed with a cam surface and having a non-rotatable portion formed with a cam surface, said cam surfaces being cooperable to cause relative longitudinal movement of said drawbar portions in response to rotation of said rotatable portion of the drawbar; and rack and pinion means associated with said drawbar for causing rotation of said rotatable drawbar portion upon swinging movement of the drawbar.

3. In a hitch for coupling a trailer and a tractor, an extensible drawbar adapted to be swingably connected at one end to a tractor and adapted to be conected at the other end to a trailer, said drawbar having a rotatable portion formed with a pinion and with a cam surface and said drawbar having a non-rotatable portion formed with a cam surface, said cam surfaces being cooperable to cause relative longitudinal movement of said drawbar portions in response to rotation of said rotatable portion of the drawbar; and rack means adapted to be carried by said tractor and cooperable with said pinion to cause rotation of said rotatable drawbar portion upon swinging movement of the drawbar.

4. In a hitch for coupling a trailer and a tractor, an extensible drawbar adapted to be swingably connected at one end to a tractor and adapted to be connected at the other end to a trailer, said drawbar having a rotatable portion formed with a pinion and with a cam surface and said drawbar having a non-rotatable portion formed with a cam surface, said cam surfaces being cooperable to cause relative longitudinal movement of said drawbar portions in response to rotation of said rotatable portion of the drawbar; and an arcuate rack adapted to be carried by said tractor and cooperable with said pinion to cause rotation of said rotatable drawbar portion upon swinging movement of the drawbar.

5. In a hitch for coupling a trailer to a tractor, an extensible drawbar adapted to be swingably connected at one end to a tractor and adapted to be connected at the other end to a trailer, said drawbar having a rotatable portion formed with a first cam surface and having a non-rotatable portion formed with a cam surface, said cam surfaces being cooperable to cause relative longitudinal movement of said drawbar portions in response to rotation of the rotatable portion of the drawbar; a pinion formed on said rotatable drawbar portion; a rack adapted to be carried by said tractor and engageable with said pinion to cause rotation of said pinion and rotatable drawbar portion upon swinging movement of the drawbar; and means including a second cam surface on the rotatable portion of said drawbar for maintaining said pinion in a predetermined position of rotation when said pinion is not engaged by said rack.

6. In a hitch for coupling a trailer and a tractor, an extensible drawbar normally in neutral position and alined with the longitudinal axis of a tractor to which it is adapted to be swingably connected at one end, the drawbar being adapted to be connected at its other end to a trailer, said drawbar having a rotatable portion formed with a pinion and with a cam surface and said drawbar having a non-rotatable portion formed with a cam surface, said cam surfaces being cooperable to cause relative longitudinal movement of said drawbar portions in response to rotation of said rotatable portion of the drawbar; an arcuate rack adapted to be carried by said tractor on one side of the neutral position of said drawbar; and an arcuate rack adapted to be carried by said tractor on the opposite side of the neutral position of said drawbar, said racks being engageable with said pinion to cause rotation of said rotatable drawbar portion upon horizontal swinging movement of the drawbar in either direction from its neutral position.

7. In a hitch for coupling a trailer to a tractor, an extensible drawbar normally in neutral position alined with the longitudinal axis of a tractor to which one end of the drawbar is adapted to be swingably connected, said drawbar being adapted to be connected at its other end to a trailer, said drawbar having a rotatable portion formed with a first cam surface and having a non-rotatable portion formed with a cam surface, said cam surfaces being cooperable to cause relative longitudinal movement of said drawbar portions in response to rotation of the rotatable portion of the drawbar; a pinion formed on said rotatable drawbar portion; an arcuate rack adapted to be carried by said tractor on one side of the neutral position of said drawbar; an arcuate rack adapted to be carried by said tractor on the opposite side of the neutral position of said drawbar, said racks being engageable with said pinion to cause rotation of said pinion and rotatable drawbar portion upon horizontal swinging movement of the drawbar in either direction from its neutral position; and means including a second cam on the rotatable portion of said drawbar for maintaining said pinion in a predetermined position of rotation when said drawbar is in its neutral position.

8. In a hitch for coupling a trailer and a tractor, an extensible drawbar normally in neutral position alined with the longitudinal axis of a tractor to which one end of the drawbar is adapted to be connected for swinging movement in a horizontal plane, said drawbar being adapted to be connected at its other end to said trailer, said drawbar having a rotatable portion formed with a pinion and with a cam surface and having a non-rotatable portion formed with a cam surface, said cam surfaces being cooperable to cause relative longitudinal movement of said drawbar portions in response to rotation of said rotatable portion of the drawbar; a horizontally extending arcuate rack adapted to be carried by said tractor above said pinion and at one side of the neutral position thereof; and a horizontally extending arcuate rack adapted to be carried by said tractor below said pinion and at the other side of the neutral position thereof, said racks and pinion being engageable to cause like rotation of said rotatable drawbar portion upon swinging movement of the drawbar in either direction from its neutral position.

9. In a hitch for coupling a trailer and a tractor, an extensible drawbar normally in neutral position alined with the longitudinal axis of a tractor to which one end of the drawbar is adapted to be connected for swinging movement in a horizontal plane, said drawbar being adapted to be connected at its other end to said trailer, said drawbar having a rotatable portion formed with a pinion and with a first cam surface and having a non-rotatable portion formed with a cam surface, said cam surfaces being cooperable to cause relative longitudinal movement of said drawbar portions in response to rotation of said rotatable portion of the drawbar; a horizontally extending arcuate rack adapted to be carried by said tractor above said pinion and at one side of the neutral position thereof; a horizontally extending arcuate rack adapted to be carried by said tractor below said pinion and at the other side of the neutral position thereof, said racks and pinion being engageable to cause like rotation of said rotatable drawbar portion upon swinging movement of the drawbar in either direction from its neutral position, and means including a second cam surface on the rotatable portion of said drawbar for maintaining said pinion in a predetermined position of rotation when said drawbar is in its neutral position.

10. In a hitch for coupling a trailer and a tractor, an extensible drawbar normally in neutral position and alined with the longitudinal axis of a tractor to which one end of the drawbar is adapted to be connected for swinging movement in a horizontal plane, said drawbar being adapted to be connected at its other end to a trailer, said drawbar having a rotatable portion formed with a pinion and with a cam surface and having a non-rotatable portion formed with a cam surface, said cam surfaces being cooperable to cause outward longitudinal movement of said non-rotatable drawbar portion in response to rotation of said rotatable portion in one direction; a horizontally extending arcuate rack adapted to be carried by said tractor above said pinion and at one side of the neutral position thereof; and a horizontally extending arcuate rack adapted to be carried by said tractor below said pinion and at the other side of the neutral position thereof, said racks and pinion being cooperable to cause rotation of said rotatable drawbar portion in a direction to cause outward movement of said non-rotatable drawbar portion upon swinging movement of the drawbar in either direction from its neutral position.

11. In a hitch for coupling a trailer and a tractor, an extensible drawbar adapted to be swingably connected at one end to a tractor and adapted to be connected at its other end to a trailer, said drawbar having a rotatable shaft portion formed with external screw threads and having a non-rotatable portion formed with a nut threaded on said shaft, said nut and shaft threads being cooperable to cause relative longitudinal movement of said drawbar portions in response to rotation of said shaft portion; and means associated with said drawbar for causing rotation of said rotatable shaft portion upon swinging movement of the drawbar.

12. In a hitch for coupling a trailer and a tractor, an extensible drawbar adapted to be swingably connected at one end to a tractor and adapted to be connected at its other end to a trailer, said drawbar having a rotatable shaft portion formed with external screw threads and having a non-rotatable portion formed with a nut threaded on said shaft, said nut and shaft threads being cooperable to cause relative longitudinal movement of said drawbar portions in response to rotation of said shaft portion; and rack and pinion means associated with said drawbar for causing rotation of said rotatable shaft portion upon swinging movement of the drawbar.

13. In a hitch for coupling a trailer and a tractor, an extensible drawbar adapted to be swingably connected at one end to a tractor and adapted to be connected at its other end to a trailer, said drawbar having a rotatable shaft portion formed with a pinion and with external screw threads, and said drawbar having a non-rotatable portion formed with a nut threaded on the threaded portion of said shaft, said nut and shaft threads being cooperable to cause relative longitudinal movement of said drawbar portions in response to rotation of said shaft portion; and rack means adapted to be carried by said tractor and cooperable with said pinion to cause rotation of said rotatable shaft portion upon swinging movement of the drawbar.

14. In a hitch for coupling a trailer to a tractor, an extensible drawbar adapted to be swingably connected at one end to a tractor and adapted to be connected at its other end to a trailer, said drawbar having a rotatable shaft portion formed with a pinion and with external screw threads and said drawbar having a non-rotatable portion formed with a nut threaded on the threaded portion of said shaft, said nut and shaft threads being cooperable to cause relative longitudinal movement of said drawbar portions in response to rotation of the rotatable shaft portion of the drawbar; rack means adapted to be carried by said tractor and engageable with said pinion to cause rotation of said pinion and rotatable shaft drawbar portion upon swinging movement of the drawbar; and means including a cam on the rotatable portion of said drawbar for maintaining said pinion in a predetermined position when said pinion is not engaged by said rack.

15. In a hitch for coupling a trailer and a tractor, an extensible drawbar normally in neutral position and alined with the longitudinal axis of a tractor to which one end of the drawbar is adapted to be swingably connected, the other end of the drawbar being adapted to be connected to a trailer, said drawbar having a rotatable shaft portion formed with a pinion and with external screw threads and said drawbar having a non-rotatable portion formed with a nut threaded on the threaded portion of said shaft, said nut and shaft threads being cooperable to cause relative longitudinal movement of said drawbar portions in response to rotation of said shaft portion; an arcuate rack adapted to be carried by said tractor on one side of the neutral position of said drawbar; and an arcuate rack adapted to be carried by said tractor on the opposite side of the neutral position of said drawbar, said racks being engageable with said pinion to cause rotation of said rotatable shaft portion upon horizontal swinging movement of the drawbar in either direction from its neutral position.

16. In a hitch for coupling a trailer and a tractor, an extensible drawbar normally in neutral position and alined with the longitudinal axis of a tractor to which one end of the drawbar is adapted to be connected for swinging movement in a horizontal plane, the drawbar being adapted to be connected at its other end to a trailer, said drawbar having a rotatable shaft portion formed with a pinion and with external screw threads and said drawbar having a non-rotatable portion formed with a nut threaded on the threaded portion of said shaft, said nut and shaft threads being cooperable to cause relative longitudinal movement of said drawbar portions in response to rotation of said shaft portion; a horizontally extending arcuate rack adapted to be carried by said tractor above said pinion and at one side of the neutral position thereof; and a horizontally extending arcuate rack adapted to be carried by said tractor below said pinion and at the other side of the neutral position thereof, said racks and pinion being engageable to cause like rotation of said rotatable drawbar portion upon swinging movement of the drawbar in either direction from its neutral position.

17. In a hitch for coupling a trailer and a tractor, an extensible drawbar normally in neutral position alined with the longitudinal axis of a tractor to which one end of the drawbar is adapted to be connected for swinging movement in a horizontal plane and the other end portion of the drawbar being adapted to be connected to a trailer, said drawbar having a rotatable shaft portion formed with a pinion and with external screw threads and said drawbar having a non-rotatable portion formed with a nut threaded on the threaded portion of said shaft, said nut and shaft threads being cooperable to cause relative longitudinal movement of said drawbar portions in response to rotation of said shaft portion; a horizontally extending arcuate rack adapted to be carried by said tractor above said pinion and at one side of the neutral position thereof; a horizontally extending arcuate rack adapted to be carried by said tractor below said pinion and at the other side of the neutral position thereof, said racks and pinion being engageable to cause like rotation of said rotatable drawbar portion upon swinging movement of the drawbar in either direction from its neutral position; and means including a cam on the rotatable shaft portion of the drawbar for maintaining said pinion and shaft portion in a predetermined position of rotation when said drawbar is in neutral position.

18. In a hitch for coupling a trailer and a tractor, an extensible drawbar normally in neutral position alined with the longitudinal axis of a tractor to which one end of the drawbar is adapted to be connected for swinging movement in a horizontal plane, the other end portion of the drawbar being adapted to be connected to a trailer, said drawbar having a rotatable shaft portion formed with a pinion and with external screw threads and said drawbar having a non-rotatable portion formed with a nut threaded on the threaded portion of said shaft, said nut and shaft threads being cooperable to cause outward longitudinal movement of the non-rotatable drawbar portion in response to rotation of said shaft portion in one direction; a horizontally extending arcuate rack adapted to be carried by said tractor above said pinion and at one side of the neutral position thereof; and a horizontally extending arcuate rack adapted to be carried by said tractor below said pinion and at the other side of he neutral position thereof, said racks and pinion being engageable to cause rotation of said rotatable drawbar portion in a direction to cause outward movement of said non-rotatable drawbar portion upon swinging movement of the drawbar in either direction from its neutral position.

19. In a hitch for coupling a trailer and a tractor, an extensible drawbar normally in neutral position alined with the longitudinal axis of a tractor to which one end of the drawbar is adapted to be connected for swinging movement in a horizontal plane, the other end portion of the drawbar being adapted to be connected to a trailer, said drawbar having a rotatable shaft portion formed with a pinion and with external screw threads and said drawbar having a non-rotatable portion formed with a nut threaded on the threaded portion of said shaft, said nut and shaft threads being cooperable to cause outward longitudinal movement of the non-rotatable drawbar portion in response to rotation of said shaft portion in one direction; a horizontally extending arcuate rack adapted to be carried by said tractor above said pinion and at one side of the neutral position thereof; a horizontally extending arcuate rack adapted to be carried by said tractor below said pinion and at the other side of the neutral position thereof, said racks and pinion being engageable to cause rotation of said rotatable drawbar portion in a direction to cause outward movement of said non-rotatable drawbar portion upon swinging movement of the drawbar in either direction from its neutral position; and means including a cam on the rotatable shaft portion of the drawbar for maintaining said pinion and shaft portion in a predetermined position of rotation when said drawbar is in neutral position.

20. In a hitch for coupling a trailer and a tractor, an extensible drawbar normally in neutral position alined with the longitudinal axis of a tractor to which one end of the drawbar is adapted to be connected for swinging movement in a horizontal plane, the other end portion of the drawbar being adapted to be connected to a trailer, said drawbar having a rotatable shaft portion formed with a pinion and with external screw threads and said drawbar having a non-rotatable portion formed with a nut threaded on the threaded portion of said shaft, said nut and shaft threads being cooperable to cause outward longitudinal movement of the non-rotatable drawbar portion in response to rotation of said shaft portion in one direction; a horizontally extending arcuate rack adapted to be carried by said tractor above said pinion and at one side of the neutral position thereof; a horizontally extending arcuate rack adapted to be carried by said tractor below said pinion and at the other side of the neutral position thereof, said racks and pinion being engageable to cause rotation of said rotatable drawbar portion in a direction to cause outward movement of said non-rotatable drawbar portion upon swinging movement of the drawbar in either direction from its neutral position; a cam formed on the rotatable shaft portion of said drawbar; and a cam follower cooperable with said cam to maintain said shaft and pinion in a predetermined position of rotation when said drawbar is in neutral position.

EDWARD F. DUFFY.

No references cited.